US005450484A

United States Patent [19]

Hamilton

[11] Patent Number: 5,450,484

[45] Date of Patent: Sep. 12, 1995

[54] VOICE DETECTION

[75] Inventor: Chris A. Hamilton, Montclair, N.J.

[73] Assignee: Dialogic Corporation, Parsippany, N.J.

[21] Appl. No.: 24,617

[22] Filed: Mar. 1, 1993

[51] Int. Cl.[6] .................... H04M 3/22

[52] U.S. Cl. .................... 379/351; 379/372; 379/386

[58] Field of Search .................... 379/67, 80, 88, 89, 379/351, 372–375, 382, 386, 282, 69; 381/46, 47

[56] References Cited

U.S. PATENT DOCUMENTS

| | | | |
|---|---|---|---|
| 4,281,218 | 7/1981 | Chuang et al. | 379/351 |
| 4,296,277 | 10/1981 | Daneffel | 379/80 |
| 4,667,065 | 5/1987 | Bangerter | 379/351 |
| 4,742,537 | 5/1988 | Jesurum | 379/351 |
| 4,764,966 | 8/1988 | Einkauf et al. | 379/351 |
| 4,932,062 | 6/1990 | Hamilton | 381/46 |
| 4,979,214 | 12/1990 | Hamilton | 381/46 |
| 4,982,341 | 1/1991 | Laurent | 381/46 |
| 5,023,906 | 6/1991 | Novas | 379/386 |
| 5,218,636 | 6/1993 | Hamilton | 379/386 |
| 5,239,574 | 8/1993 | Brandman et al. | 379/67 |
| 5,255,340 | 10/1993 | Arnaud et al. | 379/372 |
| 5,311,575 | 5/1994 | Oh | 379/386 |
| 5,311,588 | 5/1994 | Polcyn et al. | 329/386 |
| 5,319,703 | 6/1994 | Drory | 379/351 |
| 5,321,745 | 6/1994 | Drory et al. | 379/351 |
| 5,371,787 | 12/1994 | Hamilton | 379/386 |

FOREIGN PATENT DOCUMENTS

| | | | |
|---|---|---|---|
| 0222083 | 5/1987 | European Pat. Off. | 379/351 |

OTHER PUBLICATIONS

"Voice Detection and Discrimination", IBM Technical Disclosure Bulletin, vol. 27 No. 11, Apr. 1985 pp. 6519–6520 (379/351).

"Error Reduction Method for a Digital Signal Processing Voice and Audible Tel. Ring Tone Detection Algorithm" IBM T.D.B., vol. 28, No. 9 Feb. 1986 (379/351).

*Primary Examiner*—James L. Dwyer
*Assistant Examiner*—Scott L. Weaver
*Attorney, Agent, or Firm*—Michael B. Einschlag

[57] ABSTRACT

Voice detector for detecting whether a telephone signal has been produced by a voice. The voice detector obtains, on a per frame basis, measures of the following quantities relating to the telephone signal: total energy; energy and frequency of two largest energy peaks in a frequency spectrum; and signal-to-noise ratio (SNR). If the measure of total energy exceeds a predetermined threshold, the voice detector increments running sums of the following measures: total energy; frequency of the largest peak in the frequency spectrum; and SNR. Until a predetermined number of frames, referred to as a window, has been reached, for each frame, the voice detector determines whether the telephone signal was produced by ringing (incrementing a ring count if it was) and whether there is a local energy maximum (incrementing a local energy maximum count if there was). When the window is reached, the voice detector determines whether, during the window, the telephone signal was produced by ringback (updating adaptive, signal-to-noise and energy parameters if it was). If the telephone signal was not produced by ringback, the voice detector determines whether the telephone signal was produced by a voice by analyzing the running sums, the ring count, the local energy maximum count, and the adaptive, signal-to-noise and energy parameters.

10 Claims, 7 Drawing Sheets

VOICE DETECTION

TECHNICAL FIELD OF THE INVENTION

The present invention pertains to the field of telephony and, in particular, to method and apparatus for detecting whether a telephone signal is produced by a voice.

BACKGROUND OF THE INVENTION

It is known in the art that automated systems have been developed for use in telecommunications applications wherein the automated systems will initiate or transfer a telephone call to a line which is expected to be answered. Many telephone networks or switches have a drawback in that they do not provide a positive indication to the calling system whether or when the telephone call has been answered. As those in the art can readily appreciate, if the automated system can detect the presence of voice in a telephone signal, such detection can be used to indicate whether or not a telephone call has been answered and, in response, the automated system can take appropriate action.

Thus, there is need in the art for method and apparatus for detecting whether a telephone signal received, for example, by an automated telephony system is produced by a voice.

SUMMARY OF THE INVENTION

Embodiments of the present invention advantageously solve the above-identified need in the art by providing method and apparatus for detecting whether a telephone signal received, for example, by an automated telephony system is produced by a voice.

In particular, embodiments of the present invention comprise: (A) an energy detector (responsive to the telephone signal) for: (a) obtaining from the telephone signal, for a predetermined period of time referred to as a frame, (i) a measure of total energy, (ii) a measure of energy and frequency of two largest energy peaks in a frequency spectrum, and (iii) a measure of signal-to-noise ratio (SNR); and (b) transmitting the measures to a controller; (B) wherein the controller is apparatus (responsive to the measures) for: (a) storing the measures in a store; (b) determining whether the measure of total energy for the frame exceeds a predetermined threshold and, if so, for incrementing a frame counter; (c) incrementing running sums of measures of (i) total energy, (ii) frequency of the largest energy peak in the frequency spectrum, and (iii) SNR and storing them in the store; (d) transmitting a signal to a ring-frequency detector; (e) transmitting a signal to a local energy maximum detector; (f) determining whether a predetermined count of the frame counter (referred to as a window) has been reached and, if so, for transmitting a signal to a ringback detector; (C) wherein the ring-frequency detector is apparatus (responsive to the frequencies of the two largest energy peaks obtained from the store) for detecting whether the telephone signal was produced by a ringing signal and, if so, for incrementing a ring count and storing it in the store; (D) wherein the local energy maximum detector is apparatus (responsive to measures of total energy for a predetermined number of frames obtained from the store) for detecting whether there is a local energy maximum and, if so, for incrementing an energy maximum count and storing it in the store; (E) wherein the ringback detector is apparatus (responsive to the ring counter, the SNR running sum, and an indication of the measure of total energy for the window obtained from the store) for detecting whether, during the window, the signal was produced by ringback; and, if so, for transmitting a signal to an adaptor and, if not, for transmitting a signal to a voice analyzer; (F) wherein the adaptor is apparatus (responsive to the signal from the ringback detector and to running sums and adaptive parameters stored in the store) for updating the adaptive parameters; and (G) wherein the voice analyzer is apparatus (responsive to the signal from the ringback detector and to information and adaptive parameters stored in the store) for detecting whether the telephone signal was produced by a voice and, if so, for generating a signal.

BRIEF DESCRIPTION OF THE DRAWING

A complete understanding of the present invention may be gained by considering the following detailed description in conjunction with the accompanying drawing, in which.

DETAILED DESCRIPTION

Figure 1:
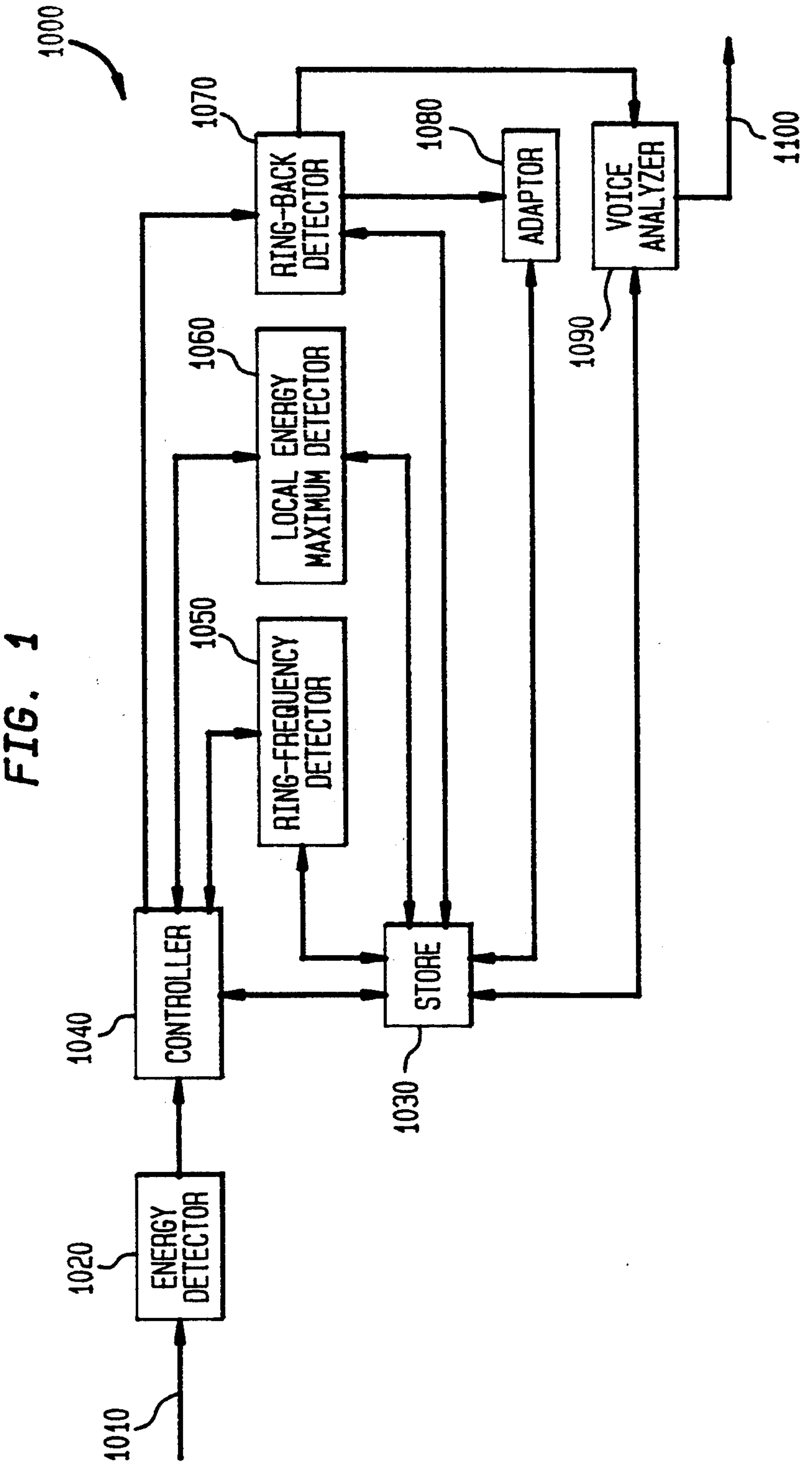
FIG. 1 shows a block diagram of an embodiment of the present invention for detecting whether a telephone signal is one that is produced by a voice.

FIG. 1 shows a block diagram of voice detector 1000 which is fabricated in accordance with the present invention. As shown in FIG. 1, telephone signal 1010 from a telephone network is applied as input to energy detector 1020. For telephone signal 1010, for a predetermined length of time, energy detector 1020 determines: (a) a measure of the total energy; (b) a measure of the energy and frequency of the two largest energy peaks in the frequency spectrum; and (c) a measure of the signal-to-noise ratio (SNR)—the predetermined length of time is referred to as a frame and a further definition of the term frame will be set forth in detail below. Then, energy detector 1020 transmits these measures to controller means 1040.

Controller means 1040 receives the measures, stores them in storage means 1030, and increments a frame counter and stores the value of the counter in storage means 1030. Next, controller means 1040 determines whether enough energy is present in the frame for the signal to possibly be voice by comparing the measure of total energy of the frame obtained from storage means 1030 with a threshold. If the measure of total energy is greater than or equal to the threshold, controller means 1040 increments a counter which counts the number of consecutive frames having a measure of energy at least equal to the threshold and stores the value of the counter in storage means 1030. Next, whenever the count is greater than 1, controller means 1040 increments a further counter and stores the value of that counter in storage means 1030. Next, controller increments running sums of the measures of total energy, frequency of the largest energy peak in the frame, and SNR and stores these sums in storage means 1030. Next, controller means 1040 sends a signal to ring-frequency detector 1050. Ring-frequency detector 1050, responsive to the measures of frequency of the two largest energy peaks obtained from storage means 1030, determines whether the signal received during the frame could be a result of a ringing signal. If so, ring-frequency detector 1050 increments a count of such frames (ring counter) and stores the ring count in storage means 1030. Then, ring-frequency detector 1050 transfers control back to controller means 1040. Next, controller means 1040 sends a signal to local energy maximum detector 1060. Local energy maximum detector 1060, responsive to measures of total energy for several frames obtained from storage means 1030, determines whether there is a local energy maximum. If so, a counter is incremented and stored in storage means 1030. Then, local energy maximum detector 1060 transfers control back to controller means 1040.

Next, controller means 1040 examines the frame counter to determine whether a predetermined number of frames corresponding to a window has been received. If so, controller means 1040 transmits a signal to ringback detector 1070. Ringback detector 1070 obtains ring counter and other information from storage means 1030 and determines whether the signal received during the window was produced by ringback. If so, ringback detector 1070 transmits a signal to adaptor 1080. If not, ringback detector 1070 transmits a signal to voice analyzer 1090. Adaptor 1080 updates adaptive parameters which are utilized in voice analyzer 1090 to detect voice; as described in detail below, three adaptive parameters are updated which define a minimum sum of total energy for a window and a minimum and maximum sum of SNR for a window. If voice analyzer 1090 determines that the telephone signal was produced by a voice, it generates signal 1100.

In accordance with the present invention, the signal is considered to have been produced by a voice if the following conditions are all true:

1. the running sum of the frequency of the largest energy peak over the window is less than a maximum sum allowable for a voice (this test advantageously eliminates noise);
2. either the running sum of SNR over the window is greater than an adaptively determined minimum SNR for voice or the running sum of total energy over the window is greater than the minimum allowable ring energy/32 (this test advantageously eliminates most ringback signals and provides detection of a voice signal having low SNR with energy which is too high to be characterized as noise);
3. the running sum of SNR over the window is less than an adaptively determined maximum SNR for voice;
4. either the count of local maxima in the window is less than a predetermined maximum number of such local maxima or the count of ring-like frames in the window is less than a predetermined maximum number of such frames per window (this test further eliminates ringback signals by utilizing the fact that ringback exhibits several energy maxima per frame, unlike voice which typically has from zero to 2 energy maxima per frame, and by counting the number of ring-like frames, which frames are ring-like because of the measured frequencies);
5. either the count of ring-like frames is less than the predetermined maximum number of such frames per window or the running sum of SNR over the window is less than the adaptively determined maximum SNR for voice divided by 4 (this test prevents elimination of a window wherein several frames have ring frequency but wherein the SNR is much lower than a typical ring SNR); and
6. the running sum of SNR over the window is less than the running sum of total energy over the window divided by 4 (this test focuses on low energy signals where I have determined that SNR is an unreliable discriminator and requires that the energy must be spread out to a predetermined degree over several frequency bins for voice.

Figure 2:
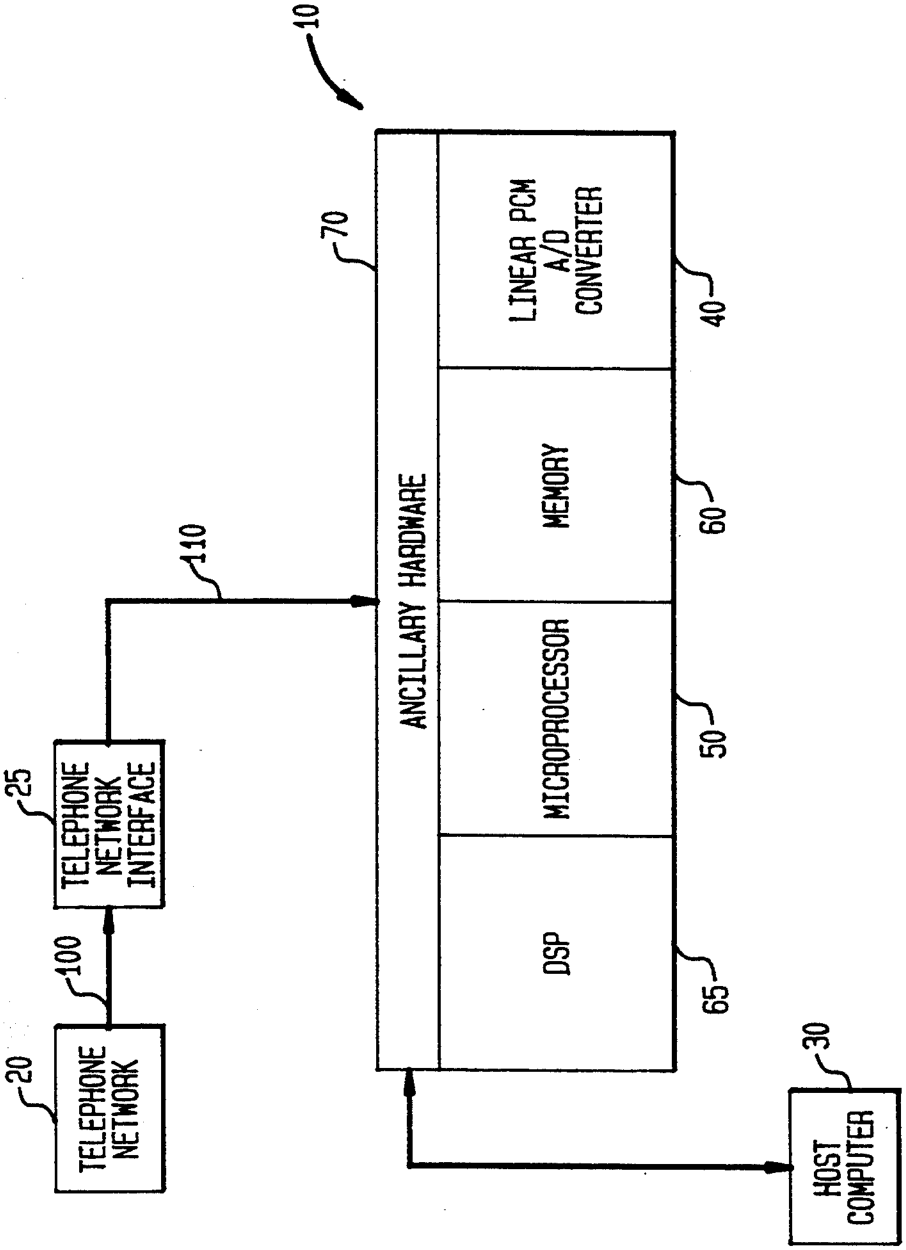
FIG. 2 shows a block diagram of a preferred embodiment of the present invention for detecting whether a telephone signal is one that is produced by a voice, which embodiment is fabricated utilizing a digital signal processor (DSP) and a microprocessor.

FIG. 2 shows a block diagram of a preferred embodiment of inventive apparatus voice detector 10 (VD 10) and the manner in which it is used for detecting whether a telephone signal received, for example, by an automated telephony system is produced by a voice. As shown in FIG. 2, analog telephone signal 100 from telephone network 20 is transmitted by telephone network interface 25 to VD 10 as signal 110. Many apparatus for use as telephone interface 25 are well known to those of ordinary skill in the art. For example, one such apparatus comprises a portion of a DIALOG/41D Digitized Voice and Telephony Computer Interface circuit which is available from Dialogic Corporation, 300 Littleton Road, Parsippany, N.J. 07054. In pertinent part, this circuit comprises well known means for interfacing with the telephone network to send and receive calls; means, such as transformers, to electrically isolate subsequent circuits; and filter circuits.

Signal 110 which is output from telephone network interface 25 is applied as input to VD 10 and, in particular, to ancillary hardware 70. Specifically, signal 110 is applied to a sample and hold circuit (not shown) in ancillary hardware 70, embodiments of which sample and hold circuit are well known to those of ordinary skill in the art.

The output from the sample and hold circuit contained in ancillary hardware 70 is applied to linear PCM analog-to-digital converter 40. There are many circuits which are well known to those of ordinary skill in the art that can be used to embody linear PCM analog-to-digital converter 40. The encoded signal output from analog-to-digital converter 40 is placed, sample by sample, into a tri-state buffer (not shown) for subsequent transmittal to a data bus (not shown). A tri-state buffer for performing this function is well known to those of ordinary skill in the art. For example, the tri-state buffer may be a TI 74LS244 tri-state buffer which is available from Texas Instruments of Dallas, Tex., or any other such equipment.

VD 10 further comprises microprocessor 50, memory 60, digital signal processor (DSP) 65, and, optionally, a portion of ancillary hardware 70 for use in interfacing with a host computer 30. DSP 65 may be any one of a number of digital signal processors which are well known to those of ordinary skill in the art such as, for example, a Motorola 56000 processor and microprocessor 50 may be any one of a number of microprocessors which are well known to those of ordinary skill in the art such as an INTEL 80188 microprocessor which is available from INTEL of Santa Clara, Calif., or any other such equipment. Memory 60 may be any one of a number of memory equipments which are well known to those of ordinary skill in the art such as an HITACHI 6264 RAM memory which is available from HITACHI America Ltd. of San Jose, Calif., or any other such equipment. The portion of ancillary hardware 70 which interfaces with host computer 30 may be readily fabricated by those of ordinary skill in the art by using circuits which are also well known to those of ordinary skill in the art. For example, the portion of ancillary hardware 70 which interfaces with host computer 30 may be comprised of TI 74LS245 data bus transceivers, TI 74LS244 address buffers, and TI PAL 16L8 control logic, all of which is available from Texas Instruments of Dallas, Tex., or any other such equipment. Finally, as shown in FIG. 2, VD 10 interfaces with host computer 30, which may be any one of a number of computers which are well known to those of ordinary skill in the art such as, for example, an IBM PC/XT/AT, or any other such equipment.

The encoded digital samples output from linear PCM analog-to-digital encoder 40 are placed in the buffer (not shown) and are output, in turn, therefrom to the data bus (not shown). Then, the digital samples are received from the data bus, digital sample by digital sample, by microprocessor 50. Microprocessor 50, in accordance with the present invention and as will be described in detail below, places a predetermined number of digital samples on the data bus for receipt and analysis by DSP 65. The output from DSP 65 is placed on the data bus for transmittance to microprocessor 50. Then, as will be described in detail below, microprocessor 50, in conjunction with a program and data stored in memory 60, analyzes the DSP output to detect whether telephone signal 100 is being produced by a voice and, in response thereto, to generate and to transmit a signal to host computer 30. As is well known to those of ordinary skill in the art, host computer 30 may be a part of an interactive system which is utilized to place telephone calls to members of the public and to connect a business agent to the member of the public after the call is answered thereby. As such, the interactive system of which host computer 30 is a part utilizes the signal provided by VD 10 to determine whether a member of the public is on the line and, if so, to obtain further information from the member of the public by connecting that member to a business agent. Such systems are well known in the art and, for simplicity, their detailed operation need not be set forth here.

If input telephone signal 100 is not an analog signal, as is the case for the embodiment shown in FIG. 2, but is instead a digital signal, embodiments of the present invention convert the digital values of the input signal into a linear PCM digital format. For example, if the input digital signal values had been encoded using u-law or A-law PCM, they are converted into a linear PCM format. This conversion is performed in accordance with methods and apparatus which are well known to those of ordinary skill in the art such as, for example, by using a look-up table stored in memory 60. Nevertheless, in describing the inventive method and apparatus, for ease of understanding, I will refer to the linear PCM digital format samples which are output from analog-to-digital encoder 40 as digital samples.

The digital samples are input into DSP 65 where they are grouped for analysis into short time duration segments of the input signal, which short time duration segments are referred to as frames. In particular, a frame is comprised of a predetermined number of samples of an input analog signal or a predetermined number of values of a input digital signal, i.e., a frame comprises digital samples or values which correspond to a time period of 12 ms. For each such frame, DSP 65 produces the frequency spectrum of the first 8 ms of the 12 ms segment and the last 4 ms of the previous 12 ms segment of input signal 100 by performing a Discrete Fourier Transform (DFT). In particular, in preferred embodiments of the present invention, the DFT is a Fast Fourier Transform (FFT) which is performed by DSP 65. Next DSP 65 determines a measure of the energy of the frequency bins in the frequency spectrum. Next, DSP 65 determines the total of the measures of energy of the frequency spectrum. Finally, DSP 65 provides frequency and a measure of energy for the two largest peaks in the frequency spectrum of the input signal—chosen from 64 bins of 62.5 Hz width.

In the preferred embodiment of the present invention shown in FIG. 2 for use in analyzing analog signal 100 which is transmitted over the public switched telephone network (PSTN) and which has a 4000 Hz bandwidth, analog signal 100 is sampled, in accordance with the Nyquist criterion, at least 8000 times/sec and the predetermined number of samples or values per frame is chosen to be 128. Further, in the preferred embodiment, in order to increase temporal resolution, a frame of 128 values which is input to DSP 65 for Fourier analysis is comprised as follows. The "present" frame comprises the last 32 samples or values from the previous frame and the next or "new" 96 samples or values which have been obtained from input signal 100. As a result, the "next" frame to be Fourier analyzed by the FFT after the "present" frame comprises the 32 "old" samples or values from the "present" frame and the next 96 samples or values obtained from input signal 100. Then, prior to calculating the FFT, each sample or value $S_n$ (where $n=0, \ldots, 127$) is multiplied by a windowing function, the values of which windowing function have been previously stored in memory. Various windowing functions which are suitable for such use are well known to those of ordinary skill in the art and are advantageous in that their use reduces anomalous spectral components due to the finite frame length of 128 samples.

As a result of the above, when DSP 65 of FIG. 2 is embodied in a Motorola 56000DSP and 128 samples are used to perform a Fast Fourier Transform (FFT), a 128 bin frequency spectrum for the input signal is produced wherein the frequency bins are 62.5 Hz wide. Each frequency bin in the frequency spectrum has a bin index denoted by n. However, because the signal is real, only the first 64 bins are of interest since the last 64 bins are identical to the first 64 bins. The real and imaginary coefficients determined by the FFT for each frequency bin are squared and summed to provide a bin energy e(n) for each frequency bin in the frequency spectrum and, in addition, the energies for each bin are summed to provide the total energy etot for the frame. Next, a predetermined number of energy maxima in the frequency spectrum of the frame are determined. An energy maximum is defined as the occurrence of a bin in the frequency spectrum of a frame which has more energy than its adjacent sidebins and, in accordance with a preferred embodiment of the present invention, the only energy maxima determined are the three largest in the spectrum. DSP 65 determines whether a third spectral peak exists in the frame; if so, DSP 65 sets flag ptotflg=1 and determines the signal-to-noise ratio ($SNR=(E_1+E_2)/E_3$ where $E_n$ is the energy of the nth peak). Then, DSP 65 transmits the total energy of the frame, the frequency and energy of the two largest energy peaks, SNR, and flag ptotflg to microprocessor 50 for analysis.

Microprocessor 50 analyzes the output from DSP 65 to detect whether a telephone signal has been produced by a voice. In particular, embodiments of the present invention detect the initial presence of a voice at the beginning of a telephone call and quickly and accurately detect a voice—normally within 100 ms of inception—while avoiding false detection during ringback or other telephone network tones and signals. As will be described below, the detection decision is based on energy, frequency and signal-to-noise characteristics of the input signal. Then, microprocessor 50 characterizes the window as either having been produced by a voice or not and all appropriate counters, variables, and flags are reset and the loop of collecting frames for the next window is restarted from the beginning. Microprocessor 50 then transmits the window characterization information to host computer 30.

Before describing the preferred embodiment of the present invention in detail by reference to a software program executed by microprocessor 50, which software program performs in accordance with a flow chart shown in FIG. 3, I will describe the software program of microprocessor 50 in general to enable those of ordinary skill in the art to more easily understand the present invention.

In accordance with the present invention, whenever microprocessor 50 is activated, an initiation module initializes the following constants: maxpk (maximum number of energy maxima in a window for voice); maxring (maximum number of ring-like frames for voice); ringthres (minimum SNR for ring); pvdwin (number of frames in a window); vthresh (minimum frame energy for voice); rflo (minimum frequency for ringback); rfhi (maximum frequency for ringback); f0max (maximum running sum of frequency of the largest energy peak over a window for voice); and rminring (maximum number of energy maxima for ring). Further, in accordance with the present invention, the following variables and flags are initialized at the beginning of a window: pvdcnt (frame counter; stop when it equals pvdwin); snrsum (the sum of SNR over all frames in the window); wintot (sum of etot over all frames in the window); rergmin (an adaptive variable used to detect voice); maxsnr (an adaptable variable used to detect voice by comparison with the running sum of SNR over the window); minsnr (an adaptable variable used to detect voice by comparison with the running sum of SNR over the window); ringcnt (number of ring-like frames in the window); peakcnt (number of frames where the frame is a local energy maximum); zeroflg (flag which is set=1 if the frame energy is too low); and sigcnt (number of consecutive frames in the window wherein etot is greater than vthresh).

The following occurs in each frame. A determination is made as to whether enough energy is present for the signal to possibly be voice by comparing the total energy of the frame, etot[0], with the minimum allowable energy for voice, vthresh. If there is too little energy in the frame, then control is transferred to the window initialization routine and a new window is begun. However, if etot[0] is greater than vthresh, a counter is incremented, i.e., sigcnt which counts the number of consecutive frames having at least vthresh energy.

Whenever sigcnt is greater than 1, i.e., there have been at least two high energy frames, there is a good chance that the signal is either ring or voice. Then, pvdcnt, the number of frames counted in the current window is incremented. Next, frequency and energy window sums f0sum and wintot are incremented. Next, frequencies f0 and f1 of the two largest energy maxima are checked to determine whether either of them falls within the range specified by rflo and rfhi. If so, then ringcnt, the counter which counts the number of ring-like frames in the window is incremented.

Next SNR is determined. If DSP 65 indicates that there was a third spectral peak present in the current frame, then SNR is determined as being equal to $(E_1+E_2)/E_3$ where $E_n$ is the energy of the nth peak. However, if there is no third spectral peak, this is usually due to a low energy condition. This anomaly is removed by scaling SNR to etot[0] as follows. If etot[0] is extremely low, then SNR is set equal to minsnr/8 and zeroflg is set to 1. then the value of SNR is added to snrsum. Finally, etot[0] is tested to determine whether the current frame is a local energy maximum and, if so, counter peakcnt is incremented.

In each window. Whenever pvdcnt equals pvdwin, the window is full and it is time to determine whether the window was produced by voice. First, the window is tested for the presence of ringback. Ringback is present if the following conditions are true:

1. snrsum is greater than ringthres, the predetermined minimum snrsum for ringback;
2. ringcnt is greater than or equal to rminring, the fixed minimum number of energy maxima for ring; and
3. zeroflg is not set.

If a determination is made that ringback is present in the current window, then snrsum is compared to the previous value of minsnr, i.e., the adaptively determined minimum running sum of SNR over the window which is used to detect voice. If snrsum is less than minsnr, then minsnr is set equal to snrsum. Further, maxsnr, i.e., the adaptively determined maximum running sum of SNR over the window which used to detect voice, is compared with snrsum/4. If snrsum/4 is greater than maxsnr, then maxsnr is set equal to snrsum/4. This adaption technique is performed in order to maximize the range that snrsum can take for voice; if ringback is known to have very high snrsum, then maxsnr should follow accordingly. Finally, rergmin, i.e., a minimum running sum of total energy over the window which is used to detect voice, is compared with wintot. If wintot is less than rergmin, i.e., the previous minimum, then rergmin is set equal to wintot.

If the current window is not a ring, then it may be voice. In accordance with the present invention, positive voice detection occurs if the following conditions are all true.

1. f0sum is less than f0max;
2. snrsum is greater than or equal to minsnr or wintot is greater than rergmin/32;
3. snrsum is less than or equal to maxsnr;
4. peakcnt is less than or equal to maxpk or ringcnt is less than maxring;
5. ringcnt is less than or equal to maxring or snrsum is less than maxsnr/4; and
6. snrsum is less than wintot/4.

Then, after the current window has been analyzed, all the variables, counters and flags are reset by transfer to the initialization routine.

With the general description set forth above in mind, the following now describes the preferred embodiment of the present invention in connection with FIG. 3A–3D.

When tone detector VD 10 is activated for the first time, certain constants are given defined values which are not changed during the operation of microprocessor 50. In particular, maxpk=2; maxring=5; ringthres=10,000; pvdwin =8; vthresh=30; rflo=200; rfhi=515; and f0max=1200. Further, at the beginning of each window, certain flags and variables are initialized. In the preferred embodiment of the present invention, this later initialization occurs by invoking an initialization routine. In this initialization routine the following are set: pvdcnt=0; snrsum=0; wintot =0; rergmin=999999; maxsnr=600; minsnr=50; ringcnt=0; peakcnt=0; zeroflg=0; and sigcnt=0.

Then as each frame of information is received by microprocessor 50 in time sequence, the frame information is transferred to the main processing routine whose flow chart is shown in FIG. 3A–3D. At box 100 of FIG. 3A, the program receives the frame information and determines whether the frame energy is below the threshold for voice; vthresh. If so, control is transferred to box 110 of FIG. 3A, otherwise, control is transferred to box 130 of FIG. 3A.

At box 110 of FIG. 3A, the energy fell below the voice threshold and the voice and ring counters are reset to 0: sigcnt=0, pvdcnt=0, peakcnt=0, ringcnt=0, snrsum=0, and wintot=0. Then, control is transferred to box 120 of FIG. 3A for transfer back to the main routine.

Figure 3A:
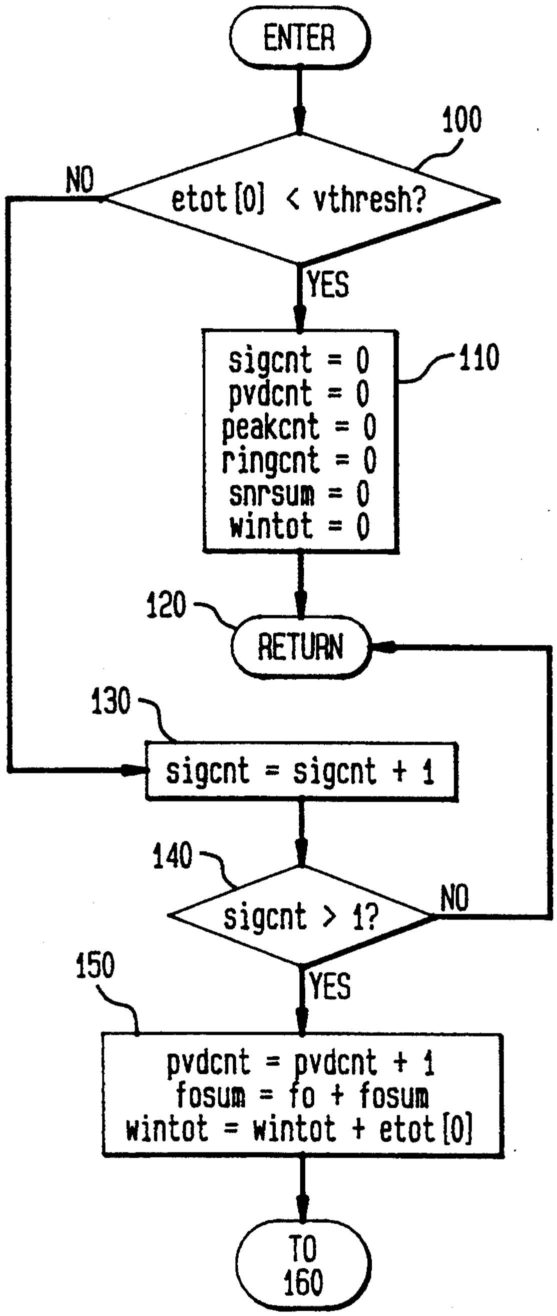
FIG. 3A–3D show a flow chart of a microprocessor program which forms part of the preferred embodiment shown in FIG. 2.

At box 130 of FIG. 3A, counter sigcnt is incremented. Then, control is transferred to box 140 of FIG. 3A.

At box 140 of FIG. 3A, the program determines whether at least two frames have had energy above voice threshold, i.e., is sigcnt greater than 1. If so, control is transferred to box 150 of FIG. 3A, otherwise, control is transferred to box 120 of FIG. 3A for transfer back to the main routine.

At box 150 of FIG. 3A, the program adds to the energy and frequency sum for each frame, i.e., f0sum=f0sum+f0 and wintot=wintot+etot[0]. The frame counter for this window is also incremented, i.e., pvdcnt=pvdcnt+1. Then, control is transferred to box 160 of FIG. 3B.

Figure 3B:
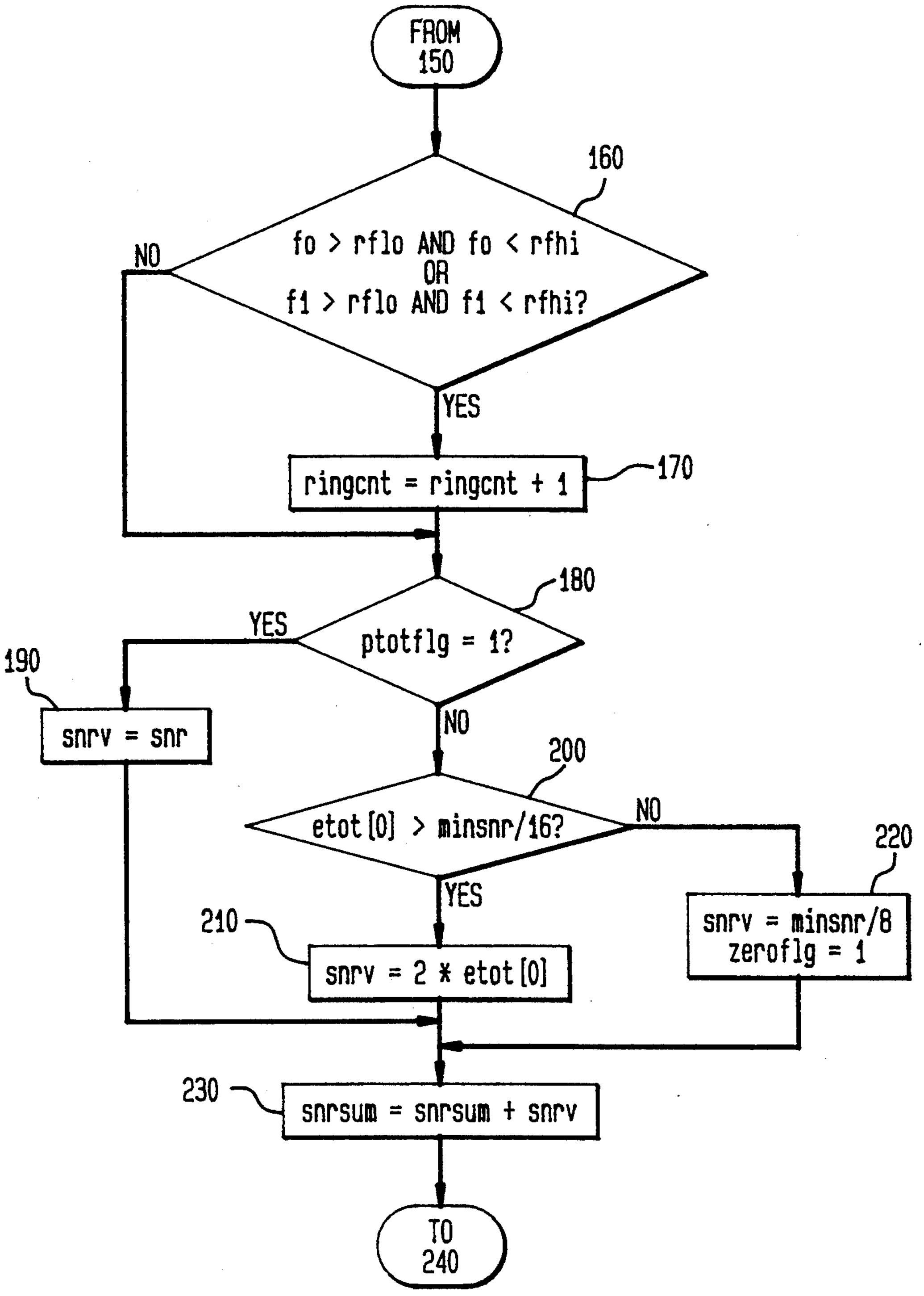

At box 160 of FIG. 3B, the program determines whether the current frame looks like a ring, i.e., it tests whether the largest two frequency components fall within a predetermined frequency range. Thus, a determination is made as to whether f0 is larger than rflo and smaller than rfhi or f1 is larger than rflo and smaller rfhi. If so, control is transferred to box 170 of FIG. 3B, otherwise, control is transferred to box 180 of FIG. 3B.

At box 170 of FIG. 3B, the program increments the ring counter, i.e., ringcnt=ringcnt+1. Then, control is transferred to box 180 of FIG. 3B.

At box 180 of FIG. 3B, the program determines whether a flag has been set to indicate whether a third frequency peak was present in the frame, i.e., whether flag ptotflg=1. If so, control is transferred to box 190 of FIG. 3B, otherwise, control is transferred to 200 of FIG. 3B.

At box 190 of FIG. 3B, there is a third peak and the program sets snrv, the signal-to-noise ratio for the window, =snr. Then, control is transferred to box 230 of FIG. 3B.

At box 200 of FIG. 3B, there is no third peak and the program determines whether etot[0] is larger than minsnr/16. If so, control is transferred to box 210 of FIG. 3B, otherwise, control is transferred to box 220 of FIG. 3B.

At box 210 of FIG. 3B, the program sets snrv=2*etot[0]. Then, control is transferred to box 230 of FIG. 3B.

At box 220 of FIG. 3B, the program sets snrv=minsnr/8 and zeroflg=1. Then, control is transferred to box 230 of FIG. 3B.

At box 230 of FIG. 3B, the program increments the sum of signal-to-noise ratio for each frame of the window, i.e., snrsum=snrsum+snrv. Then, control is transferred to box 240 of FIG. 3C.

Figure 3C:
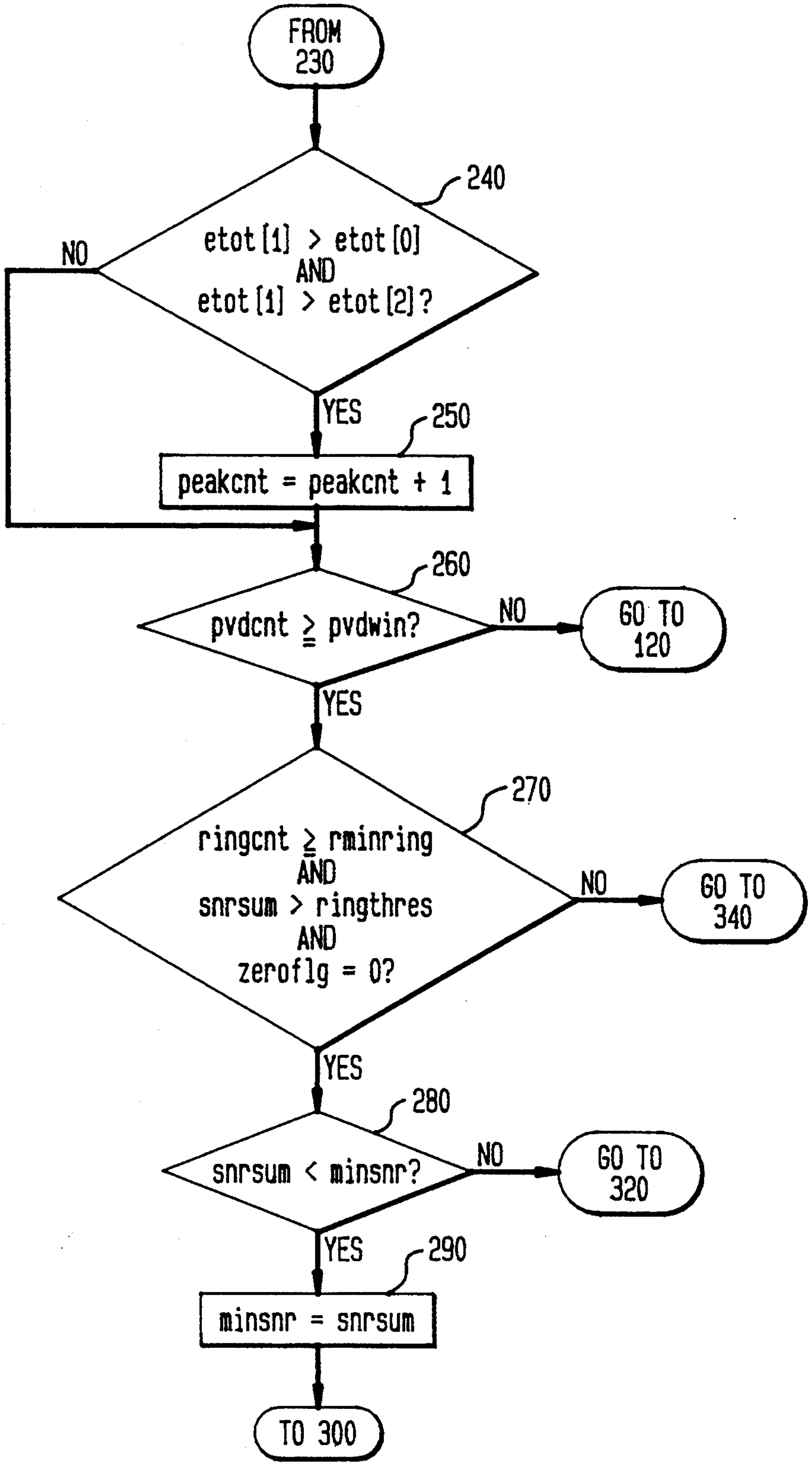

At box 240 of FIG. 3C, the program determines whether there is an energy maximum by determining whether etot[1] is greater than etot[0] and etot[1] is greater than etot[2]. If so, control is transferred to box 250 of FIG. 3C, otherwise, control is transferred to box 260.

At box 250 of FIG. 3C, there is an energy maximum and the program increments the peak counter, i.e., peakcnt=peakcnt+1. Then, control is transferred to box 260 of FIG. 3C.

At box 260 of FIG. 3C, the program determines whether the entire window has been received, i.e., the program determines whether pvdcnt is greater than or equal to pvdwin. If so, control is transferred to box 270, otherwise, control is transferred to box 120 for transfer of control back to the main module.

At box 270 of FIG. 3C, the program determines whether the frame was a ring. The program determines whether ringcnt is greater than or equal to rminring and snrsum is greater than ringthres and zeroflg equal 0. If so, control is transferred to box 280 of FIG. 3C, otherwise, control is transferred to box 340.

At box 280 of FIG. 3C, the program has detected a ring and an adaption of parameters is made. The program determines whether snrsum is less than minsnr. If so, control is transferred to box 290 of FIG. 3C, otherwise, control is transferred to box 320 of FIG. 3C.

At box 290 of FIG. 3C, the program sets minsnr=snrsum. Then, control is transferred to box 300 of FIG. 3D.

Figure 3D:
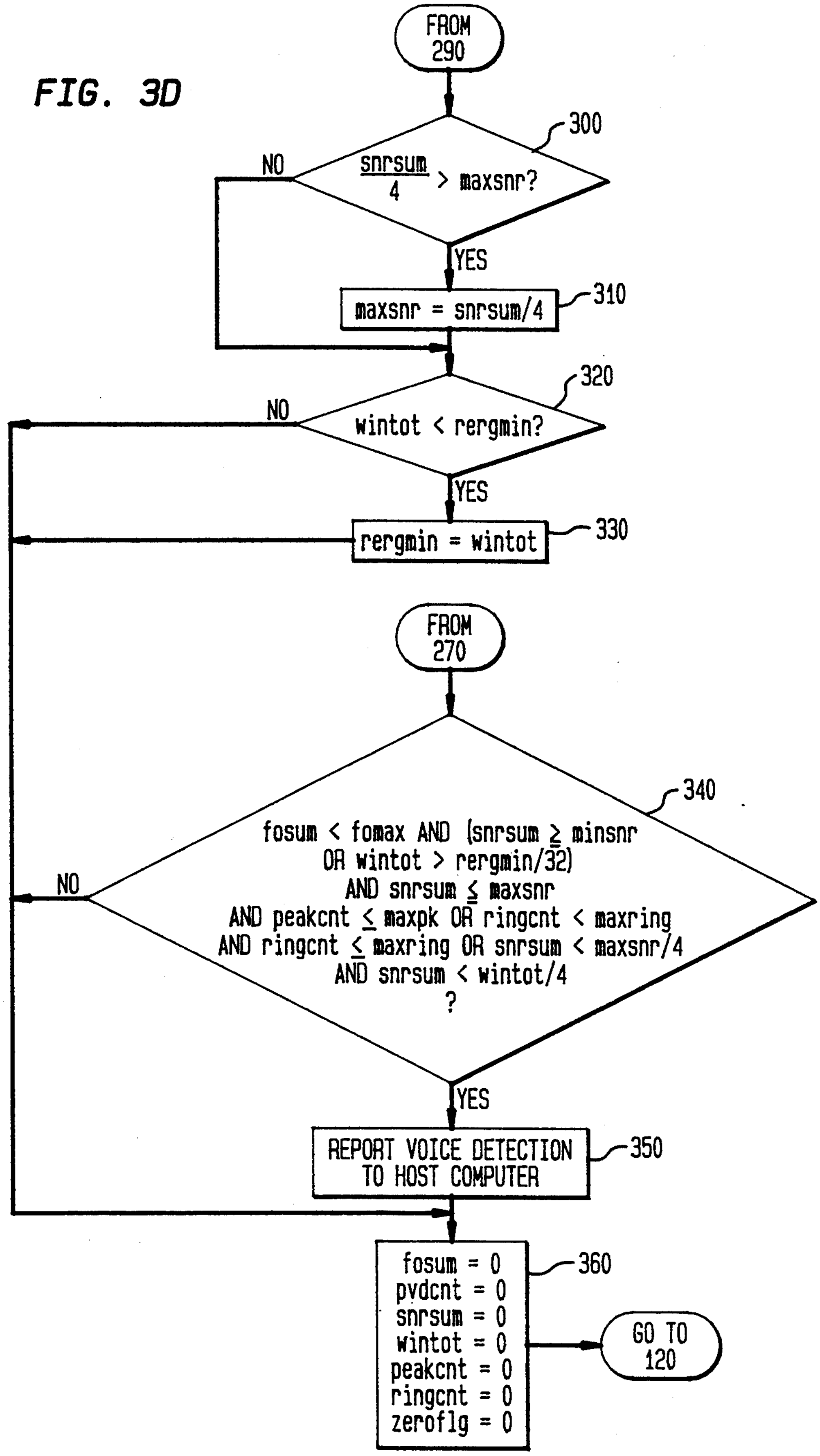

At box 300 of FIG. 3D, the program determines whether snrsum/4 is greater than maxsnr. If so, control is transferred to box 310 of FIG. 3D, otherwise, control is transferred to box 320 of FIG. 3D.

At box 310 of FIG. 3D, the program sets maxsnr=snrsum/4. Then, control is transferred to box 320 of FIG. 3D.

At box 320 of FIG. 3D, the program determines whether wintot is less than rergmin. If so, control is transferred to box 330 of FIG. 3D, otherwise, control is transferred to box 360 of FIG. 3D.

At box 330 of FIG. 3D, the program sets rergmin=wintot. Then, control is transferred to box 360 of FIG. 3D.

At box 340 of FIG. 3D, the program determines whether the frame was voice. The program determines whether: f0sum<f0max and (snrsum≧minsnr or wintot>rergmin/32); and snrsum ≦maxsnr and peakcnt≦maxpk or ringcnt<maxring and ringcnt ≦maxring or snrsum<maxsnr/4 and snrsum<wintot/4. If so, control is transferred to box 350 of FIG. 3D, otherwise, control is transferred to box 360 of FIG. 3D.

At box 350 of FIG. 3D, microprocessor 50 reports the detection of voice to host computer 30. Then, control is transferred to box 360 of FIG. 3D.

At box 360 of FIG. 3, the program resets window counters and flags to zero, i.e., f0sum=0, pvdcnt=0, snrsum=0, wintot=0, peakcnt=0, ringcnt=0, and zeroflg =0. Then, control is transferred to box 120 for transfer of control back to the main module.

As should be clear to those of ordinary skill in the art, the embodiment of the present invention which was described in detail above is voice detector which analyzes an input signal and, in response thereto, generates a detection signal for use by another apparatus such as host computer 30. For example, the another apparatus can be an interactive system which can place telephone calls to people for the purpose of interacting therewith. In such a system, embodiments of the present invention advantageously provide detection of a voice signal so as to efficiently transfer the telephone call to a business agent.

Figure 4:
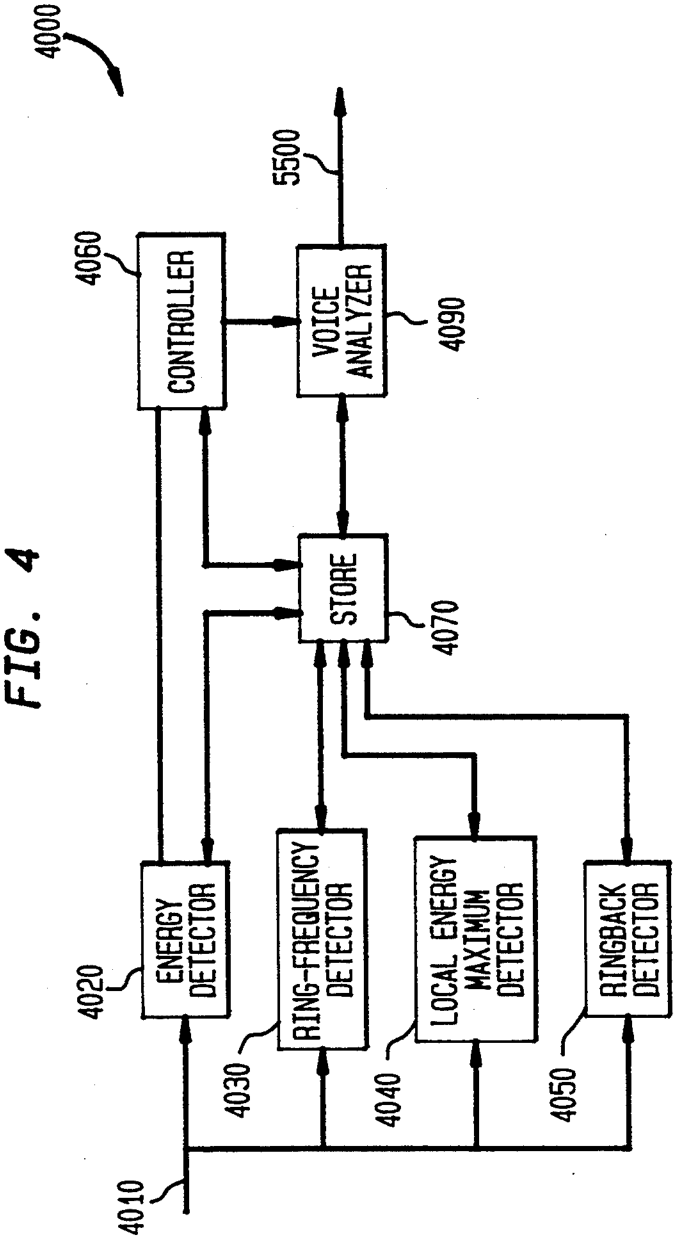
FIG. 4 shows a block diagram of another embodiment of the present invention for detecting whether a telephone signal is one that is produced by a voice.

FIG. 4 shows a block diagram of voice detector 4000 which is fabricated in accordance with the present invention. As shown in FIG. 4, telephone signal 4010 from a telephone network is applied as input to energy detector 4020, ring-frequency detector 4030, local energy maximum detector 4040, and ringback detector 4050. For telephone signal 4010, for a frame, energy detector 4020 determines: (a) a measure of the total energy; (b) a measure of the energy and frequency of the two largest energy peaks in the frequency spectrum; and (c) a measure of the signal-to-noise ratio (SNR). Then, if the measure of total energy is greater than or equal to a threshold, energy detector 4020 increments running sums of the measures of total energy, frequency of the largest energy peak in the frame, and SNR and stores the measures and the running sums in storage means 4070. Then, energy detector 4020 transmits a signal to controller means 4060.

Ring-frequency detector 4030 is apparatus which is well known to those of ordinary skill in the art for determining whether the signal received during the frame could be a result of a ringing signal. If so, ring-frequency detector 4030 increments a count of such frames (ring counter), stores the ring count in storage means 4070.

Local energy maximum detector 4040 is apparatus which can readily be fabricated by those of ordinary skill in the art for determining whether there is a local energy maximum in the telephone signal. If so, a counter is incremented and stored in storage means 4070.

Ringback detector 4050 is apparatus which can be readily fabricated by those of ordinary skill in the art for determining whether a signal received during a predetermined period of time referred to as a window was produced by ringback. If so, ringback detector 4050 updates three adaptive parameters which are used to detect voice, i.e., a minimum sum of total energy for a window and a minimum and maximum sum of SNR for a window.

Controller means 4060 is apparatus which can be readily fabricated by one of ordinary skill in the art. In particular, controller means 4060, in response to the signal from energy detector 4020, increments a frame counter and stores the value of the counter in storage means 4070. Next, controller means 4060 determines whether enough energy is present in the frame for the signal to possibly be voice by comparing the measure of total energy of the frame obtained from storage means 4070 with a threshold. If the measure of total energy is greater than or equal to the threshold, controller means 4060 increments a counter which counts the number of consecutive frames having a measure of energy at least equal to the threshold and stores the value of the counter in storage means 4070. Next, controller means 4060 examines the frame counter to determine whether a predetermined number of frames corresponding to a window has been received and, if so, controller 4060 transmits a signal to voice analyzer 4090.

Voice analyzer 4090 is apparatus like voice analyzer 1090 described above for determining whether telephone signal 4010 was produced by a voice and, if so, for generating signal 5500.

Those skilled in the art recognize that further embodiments of the present invention may be made without departing from its teachings. For example, in accordance with the present invention, the energy in the frequency bins in the frequency spectrum of a frame of the signal, e(n), may be determined in many different ways. In particular, in another embodiment of the present invention, e(n) equals the sum of the absolute value of the real part of the component of frequency bin n and the absolute value of the imaginary part of the component of frequency bin n. In addition, the above embodiment may be alternatively implemented utilizing specific hardware apparatus in place of the microprocessor and program embodiment described above.

What is claimed is:

1. A voice detector for detecting whether a telephone signal has been produced by voice, the voice detector comprising:

energy detector means, responsive to the telephone signal, (i) for obtaining measures from the telephone signal in a predetermined period of time referred to as a frame, the measures including: (a) a measure of total energy for the frame, (b) a measure of frequency of each of two largest energy peaks in a frequency spectrum, and (c) a measure of signal-to-noise ratio (SNR); and (ii) for transmitting the measures obtained by the energy detector means to a controller means;

the controller means, responsive to the measures from the energy detector means, for determining whether the measure of total energy for the frame exceeds a predetermined threshold and, if the predetermined threshold is exceeded, for incrementing a frame count and for storing the frame count in a storage means and for: (a) storing the measures obtained by the energy detector means in the storage means; (b) incrementing running sums, including a running sum of the measure of total energy for the frame, a running sum of a measure of frequency of a larger of the two largest energy peaks in the frequency spectrum, and a running sum of the measure of SNR and storing the running sums in the storage means; (c) transmitting a ring-frequency signal to a ring-frequency detector; (d) transmitting a local-energy-maximum signal to a local energy maximum detector; and (e) determining whether the frame count equals a predetermined count referred to as a window and, if the frame count equals the window, transmitting a ringback detect signal to a ringback detector;

the ring-frequency detector being apparatus, responsive to the ring-frequency signal from the controller means, for obtaining from the storage means the measure of the frequency of each of the two largest energy peaks, for detecting whether the telephone signal was produced by a ringing signal and, if the telephone signal was produced by the ringing signal, for incrementing a ring count and storing the ring count in the storage means;

the local energy maximum detector being apparatus, responsive to the local-energy-maximum signal from the controller means, for obtaining from the storage means the measures of total energy for the frame for a predetermined number of frames, for detecting whether there is a local energy maximum and, if there is the local energy maximum, for incrementing a local energy maximum count and storing the local energy maximum count in the storage means;

the ringback detector being apparatus, responsive to the ringback detect signal from the controller means, for obtaining from the storage means data, the data including the ring count and the running sum of the measure of SNR, for detecting whether the telephone signal was produced by a ringback signal during the window; and, if the telephone signal was produced by the ringback signal during the window, for transmitting an adaptor signal to an adaptor means and, if the telephone signal was not produced by the ringback signal during the window, for transmitting a voice-analyzer signal to a voice analyzer;

the adaptor means being apparatus, responsive to the adaptor signal from the ringback detector, for obtaining from the storage means the running sum of the measure of total energy for the frame, the running sum of the measure of SNR, at least one adaptive signal-to-noise voice analysis parameter, and an adaptive energy voice analysis parameter, and for adaptively updating the at least one adaptive signal-to-noise voice analysis parameter and the adaptive energy voice analysis parameter; and the voice analyzer being apparatus, responsive to the voice-analyzer signal from the ringback detector, for obtaining from the storage means the running sums, the ring count, the local energy maximum count, the at least one adaptive signal-to-noise voice analysis parameter, and the adaptive energy voice analysis parameter, for detecting whether the telephone signal was produced by voice and, if the telephone signal was produced by voice, for generating a signal which indicates that the telephone signal was produced by voice.

2. The voice detector of claim 1 wherein the ringback detector comprises means for determining whether: (a) the running sum of the measure of SNR is greater than a predetermined signal-to-noise threshold value and (b) the ring count is greater than a predetermined ringcount threshold value.

3. The voice detector of claim 2 wherein the adaptor means for adaptively updating the at least one adaptive signal-to-noise voice analysis parameter and the adaptive energy voice analysis parameter comprises means for adaptively updating an adaptive minimum value of a function of the running sum of the measure of SNR; an adaptive maximum value of a function of the running sum of the measure of SNR; and an adaptive minimum value of a function of the running sum of the measure of total energy for the frame.

4. The voice detector of claim 3 wherein the voice analyzer comprises means for detecting whether: (a) the running sum of a measure of frequency of a larger of the two largest energy peaks is less than a predetermined frequency sum; (b) the running sum of the measure of SNR is greater than the adaptive minimum value of the function of the running sum of the measure of SNR or the running sum of the measure of total energy for the frame is greater than a predetermined fraction of the adaptive minimum value of the function of the running sum of the measure of total energy for the frame; (c) the running sum of the measure of SNR is less than the adaptive maximum value of the function of the running sum of the measure of SNR; (d) the local energy maximum count is less than a predetermined local energy count or the ring count is less than a predetermined maximum ring count; (e) the ring count is less than the predetermined maximum ring count or the running sum of the measure of SNR is less than a predetermined fraction of the adaptive maximum value of the function of the running sum of the measure of SNR; and (f) the running sum of the measure of SNR is less than a predetermined fraction of the running sum of the measure of total energy for the frame.

5. A method for detecting whether a telephone signal has been produced by voice, the method comprising:

a first step of, in a predetermined period of time referred to as a frame, obtaining measures from the telephone signal, the measures including: (a) a measure of total energy for the frame, (b) a measure of frequency of each of two largest energy peaks in a frequency spectrum, and (c) a measure of signal-to-noise ratio (SNR);

determining whether the measure of the total energy in the frame exceeds a predetermined threshold and, if the predetermined threshold is exceeded, incrementing a frame count;

incrementing running sums, the running sums including a running sum of the measure of total energy for the frame, a running sum of a measure of frequency of the larger of the two largest energy peaks in the frequency spectrum, and a running sum of the measure of SNR;

determining a measure of comparison of the measure of total energy in the frame with an adaptive signal-to-noise voice analysis parameter;

utilizing the measures of the frequencies of the two largest energy peaks, detecting whether the telephone signal was produced by a ringing signal and, if the telephone signal was produced by the ringing signal, incrementing a ring count;

utilizing the measures of total energy for the frame for a predetermined number of frames, detecting whether there is a local energy maximum and, if there is the local energy maximum, incrementing a local energy maximum count;

determining whether the frame count equals a predetermined count referred to as a window and, if the frame count equals the window, transferring control to a ringback detecting step, otherwise transferring control to the first step;

wherein the ringback detecting step, utilizing the ring count, the measure of comparison and the running sum of the measure of SNR, comprises steps of detecting whether the telephone signal during the window was produced by a ringback signal; if the telephone signal was produced by the ringback signal during the window, transferring control to an adapting step and, if the telephone signal was not produced by the ringback signal during the window, transferring control to a voice analyzing step;

wherein the adapting step, utilizing the running sum of the measure of total energy for the frame, the running sum of the measure of SNR, the adaptive signal-to-noise voice analysis parameter, a further adaptive signal-to-noise voice analysis parameter, and an adaptive energy voice analysis parameter, comprises steps of adaptively updating the adaptive signal-to-noise voice analysis parameter, the further adaptive signal-to-noise voice analysis parameter, and the adaptive energy voice analysis parameter and transferring control to the first step; and wherein the voice analyzing step, utilizing the running sums, the ring count, the local energy maximum count, the adaptive signal-to-noise voice analysis parameter, the further adaptive signal-to-noise voice analysis parameter, and the adaptive energy voice analysis parameter, comprises a step of determining whether the telephone signal was produced by voice and, if the telephone signal was produced by voice, generating a signal which indicates that the telephone signal was produced by voice.

6. A voice detector for detecting whether a telephone signal has been produced by voice, the voice detector comprising:

frame analysis means, responsive to the telephone signal, (a) in a predetermined period of time referred to as a frame, for obtaining from the telephone signal and for storing in a storage means, a measure of total energy for the frame, a measure of frequency of each of two largest energy peaks in a frequency spectrum, and a measure of signal-to-noise ratio (SNR) and (b) for the frame: (i) for determining whether the measure of total energy for the frame exceeds a predetermined threshold and, if the predetermined threshold is exceeded, for incrementing a frame count, for incrementing and storing in the storage means running sums, the running sums including a running sum of the measure of total energy for the frame, a running sum of a measure of frequency of a larger of the two largest energy peaks in the frequency spectrum, and a running sum of the measure of SNR; (ii) for utilizing the measure of the frequency of each of the two largest energy peaks, for detecting whether the telephone signal was produced by a ringing signal and, if the telephone signal was produced by the ringing signal, for incrementing a ring count and storing the ring count in the storage means; (iii) for obtaining from the storage means the measures of total energy for the frame for a predetermined number of frames, for detecting whether there is a local energy maximum and, if there is the local energy maximum, for incrementing a local energy maximum count and storing the local energy maximum count in the storage means; and (iv) for determining whether the frame count equals a predetermined count referred to as a window and, if the frame count equals the window for transmitting a ringback detect signal to a ringback detector means;

the ringback detector being apparatus, responsive to the ringback detect signal from the frame analysis means, for obtaining data from the storage means, the data including the ring count and the running sum of the measure of SNR, for detecting whether the telephone signal was produced by a ringback signal during the window; and, if the telephone signal was produced by the ringback signal, for obtaining from the storage means the running sum of the measure of total energy for the frame, at least one adaptive signal-to-noise voice analysis parameter, and an adaptive energy voice analysis parameter, for adaptively updating the at least one adaptive signal-to-noise voice analysis parameter and the adaptive energy voice analysis parameter and, if the telephone signal was not produced by the ringback signal, for transmitting a voice-analyzer signal to a voice analyzer;

the voice analyzer being apparatus, responsive to the voice-analyzer signal from the ringback detector, for obtaining from the storage means the running sums, the ring count, the local energy maximum count, the at least one adaptive, signal-to-noise voice analysis parameter, and the adaptive energy voice analysis parameter, for detecting whether the telephone signal was produced by voice and, if the telephone signal was produced by voice, for generating a signal which indicates that the telephone signal was produced by voice.

7. A voice detector for detecting whether a telephone signal has been produced by voice, the voice detector comprising:

frame analysis means, responsive to the telephone signal, (a) for obtaining measures from the telephone signal for a predetermined period of time referred to as a frame, the measures including, a measure of total energy for the frame, a measure of frequency of each of two largest energy peaks a frequency spectrum, and a measure of signal-to-noise ratio (SNR) and (b) for the frame: (i) for determining whether the measure of total energy in the frame exceeds a predetermined threshold and, if the predetermined threshold is exceeded, incrementing a frame counter, storing in the storage means the measure of total energy for the frame, storing in the storage means the measure of frequency of each of two largest energy peaks, incrementing running sums and storing the running sums in the storage means, the running sums including a running sum of the measure of total energy for the frame, a running sum of a measure of frequency of a larger of the two largest energy peaks, and a running sum of the measure of SNR; (ii) for utilizing the measure of the frequency of each of the two largest energy peaks, for detecting whether the telephone signal was produced by a ringing signal and, if the telephone signal was produced by the ringing signal, for incrementing a ring count and storing the ring count in the storage means; (iii) for obtaining from the storage means the measures of the total energy for the frame for a predetermined number of frames, for detecting whether there is a local energy maximum and, if there is the local energy maximum, for incrementing a local energy maximum count and storing the local energy maximum count in the storage means; and (iv) for determining whether the frame count equals a predetermined count referred to as a window and, if the frame count equals the window, transmitting a ringback detect signal to a ringback detector;

the ringback detector being apparatus, responsive to the ringback detect signal from the frame analysis means, for obtaining data from the storage means, the data including the ring count and the running sum of the measure of SNR, for detecting whether the telephone signal was produced by a ringback signal during the window; and, if the telephone signal was produced by the ringback signal, for obtaining from the storage means the running sum of the measure of total energy for the frame, at least one adaptive signal-to-noise voice analysis parameter, and an adaptive energy voice analysis parameter for adaptively updating the at least one adaptive signal-to-noise voice analysis parameter and the adaptive energy voice analysis parameter and, if the telephone signal was not produced by the ringback signal, for transmitting a voice-analyzer signal to a voice analyzer;

the voice analyzer being apparatus, responsive to the voice-analyzer signal from the ringback detector means, for obtaining from the storage means the running sums, the ring count, the local energy maximum count, the at least one adaptive signal-to-noise voice analysis parameter, and the adaptive energy voice analysis parameter, for detecting whether the telephone signal was produced by voice and, if the telephone signal was produced by voice, for generating a signal which indicates that the telephone signal was produced by voice.

8. A voice detector for detecting whether a telephone signal has been produced by voice, the voice detector comprising:

energy detector means, responsive to the telephone signal, for: (i) obtaining measures from the telephone signal in a predetermined period of time referred to as a frame, the measures including: (a) a measure of total energy for the frame, (b) a measure of frequency of each of two largest energy peaks in a frequency spectrum, and (c) a measure of signal-to-noise ratio (SNR) and for storing the measures obtained by the energy detector means in a storage means; and (ii) determining whether the measure of total energy for the frame exceeds a predetermined threshold and, if the predetermined threshold is exceeded, for incrementing running sums and storing the running sums in the storage means, the running sums including a running sum of the measure of total energy for the frame, a running sum of a measure of frequency of a larger of the two largest energy peaks in the frequency spectrum, and a running sum of the measure of SNR; and (iii) transmitting a controller signal to a controller means;

a ring detector means, responsive to the telephone signal, for detecting whether the telephone signal was produced by a ringing signal during the frame and, if the telephone signal was produced by the ringing signal, for incrementing a ring count and storing the ring count in the storage means;

a local energy maximum detector means, responsive to the telephone signal, for detecting whether there is a local energy maximum during the frame and, if there is the local energy maximum, for incrementing a local energy maximum count and storing the local energy maximum count in the storage means;

a ringback detector means, responsive to the telephone signal, for detecting whether the telephone signal was produced by a ringback signal in a predetermined number of frames referred to as a window; and, if the telephone signal was produced by the ringback signal, storing a ringback indication data in the storage means and obtaining from the storage means, the running sum of the measure of the total energy for the frame, the running sum of the measure of SNR, at least one adaptive signal-to-noise voice analysis parameter, and an adaptive energy voice analysis parameter, for adaptively updating the at least one adaptive signal-to-noise voice analysis parameter and the adaptive energy voice analysis parameter;

the controller means, responsive to the controller signal from the energy detector means, for determining whether the measure of total energy for the frame exceeds a predetermined threshold and, if the predetermined threshold is exceeded, for incrementing a frame count; (b) determining whether the frame count equals the window and, if the frame count equals the window, obtaining the ringback indication data from the storage means and, if the ringback indication shows that the telephone signal was not produced by the ringback signal, transmitting a voice-analyzer signal to a voice analyzer;

the voice analyzer being apparatus, responsive to the voice-analyzer signal from the controller means, for obtaining from the storage means the running sums, the ring count, the local energy maximum count, the at least one adaptive signal-to-noise voice analysis parameter and the adaptive energy voice analysis parameter, for detecting whether the telephone signal was produced by voice and, if the telephone signal was produced by voice, for generating a signal which indicates that the telephone signal was produced by voice.

9. A method for detecting whether a telephone signal has been produced by voice, the method comprising:

a first step of, in a predetermined period of time referred to as a frame, (a) obtaining measures from the telephone signal, the measures including: (i) a measure of total energy for the frame obtained from the telephone signal, (ii) a measure of frequency of a largest energy peak in a frequency spectrum obtained from the telephone signal, and (iii) a measure of signal-to-noise ratio (SNR) obtained from the telephone signal; (b) determining whether the measure of total energy for the frame exceeds a predetermined threshold and, if the predetermined threshold is exceeded, (i) incrementing a frame count; and (ii) incrementing running sums, the running sums including a running sum of the measure of total energy for the frame, a running sum of the measure of frequency of the largest energy peak in the frequency spectrum, and a running sum of the measure of SNR;

detecting whether the telephone signal was produced by a ringing signal and, if the telephone signal was produced by the ringing signal, incrementing a ring count;

detecting whether there is a local energy maximum and, if there is a local energy maximum, incrementing a local energy maximum count;

determining whether the frame count equals a predetermined count referred to as a window and, if the frame count equals the window, transferring control to a ringback detecting step, otherwise transferring control to the first step;

wherein the ringback detecting step comprises steps of detecting whether the telephone signal during the window was produced by a ringback signal; and, if the telephone signal was produced by the ringback signal, transferring control to an adapting step and, if the telephone signal was not produced by the ringback signal, transferring control to a voice analyzing step;

wherein the adapting step, utilizing the running sum of the measure of total energy for the frame, the running sum of the measure of SNR, at least one adaptive signal-to-noise voice analysis parameter, and an adaptive energy voice analysis parameter comprises steps of adaptively updating the at least one adaptive signal-to-noise voice analysis parameter, and the adaptive energy voice analysis parameter and transferring control to the first step; and wherein the voice analyzing step, utilizing the running sums, the ring count, and the local energy maximum count, the at least one adaptive signal-to-noise voice analysis parameter, and the adaptive energy voice analysis parameter, comprises a step of determining whether the telephone signal was produced by voice and, if the telephone signal was produced by voice, generating a signal which indicates that the telephone signal was produced by voice.

10. A voice detector for detecting when a telephone signal was produced by a voice signal, the voice detector comprises:

means, in response to receiving the telephone signal, (a) for obtaining, in a predetermined period of time referred to as a frame, a measure of total energy for the frame; a measure of frequency of two largest energy peaks in a frequency spectrum for the frame; and a measure of signal-to-noise ratio (SNR) for the frame; (b) for determining if the measure of total energy exceeds a predetermined threshold and, if the measure of total energy for the frame exceeds the predetermined threshold, for incrementing a frame counter, a running sum of the measure of total energy for the frame, a running sum of the measure of SNR, and a running sum of the measure of frequency of a larger of the two largest energy peaks; (c) (i) for the frame, for determining whether the telephone signal was produced by a ringing signal and for incrementing a ring count if the telephone signal was produced by the ringing signal in the frame and (ii) for the frame, for determining whether there is a local energy maximum and for incrementing a local energy maximum count if there is the local energy maximum; (d) for determining when the frame counter equals a predetermined number of frames, referred to as a window and, when the frame counter equals the window, for determining whether, during the window, the telephone signal was produced by a ringback signal and updating at least one adaptive signal-to-noise voice analysis parameter and an adaptive energy voice analysis parameter if the telephone signal was produced by the ringback signal and, if the telephone signal was not produced by the ringback signal, for determining whether the telephone signal was produced by the voice signal by analyzing the running sum of the measure of total energy for the frame, the running sum of the measure of SNR, the running sum of the measure of frequency of a larger of the two largest energy peaks the ring count, the local energy maximum count, the at least one adaptive signal-to-noise voice analysis parameter and the adaptive energy voice analysis parameter and, if the telephone signal was produced by the voice signal, for generating a signal which indicates that the telephone signal was produced by the voice signal.

* * * * *